A. KINGSBURY.
BEARING.
APPLICATION FILED AUG. 29, 1917. RENEWED SEPT. 21, 1920.
1,378,546.
Patented May 17, 1921.
2 SHEETS—SHEET 1.
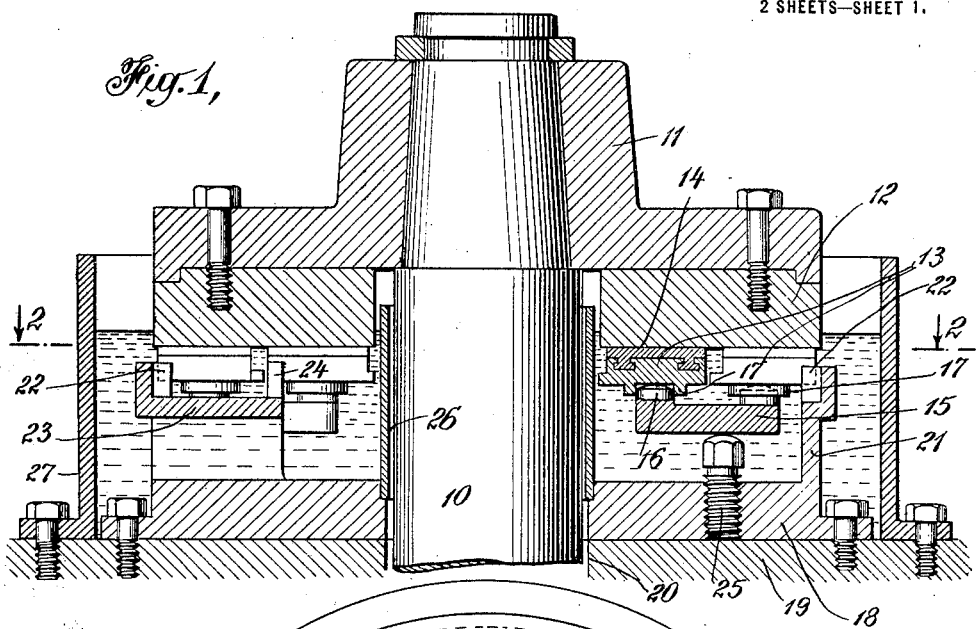
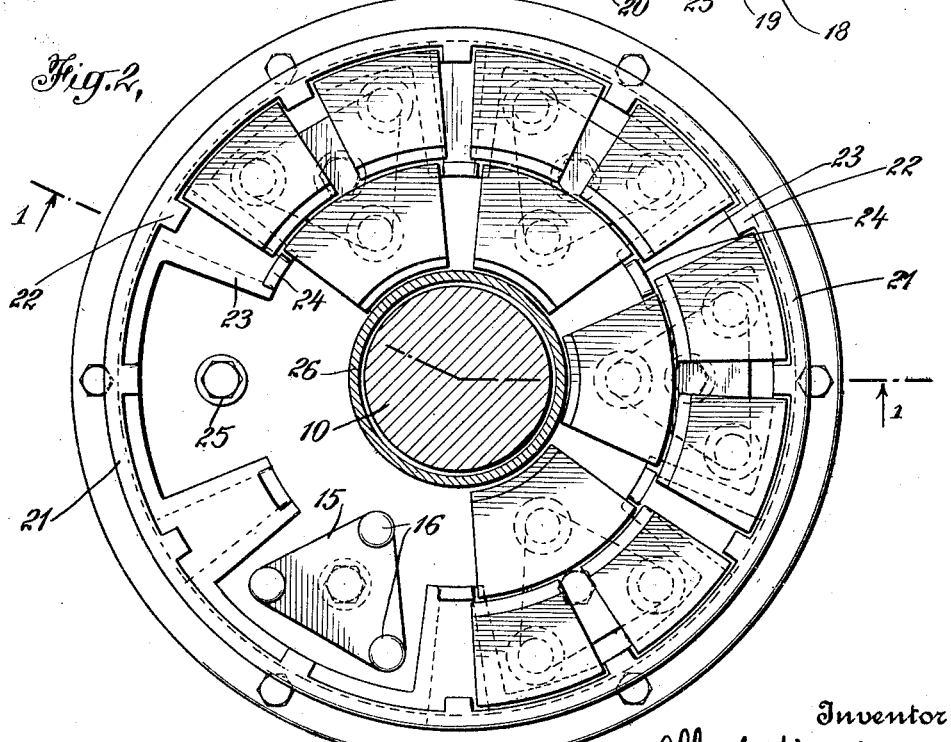
Inventor
Albert Kingsbury
By his Attorneys
Marshall & Dearborn

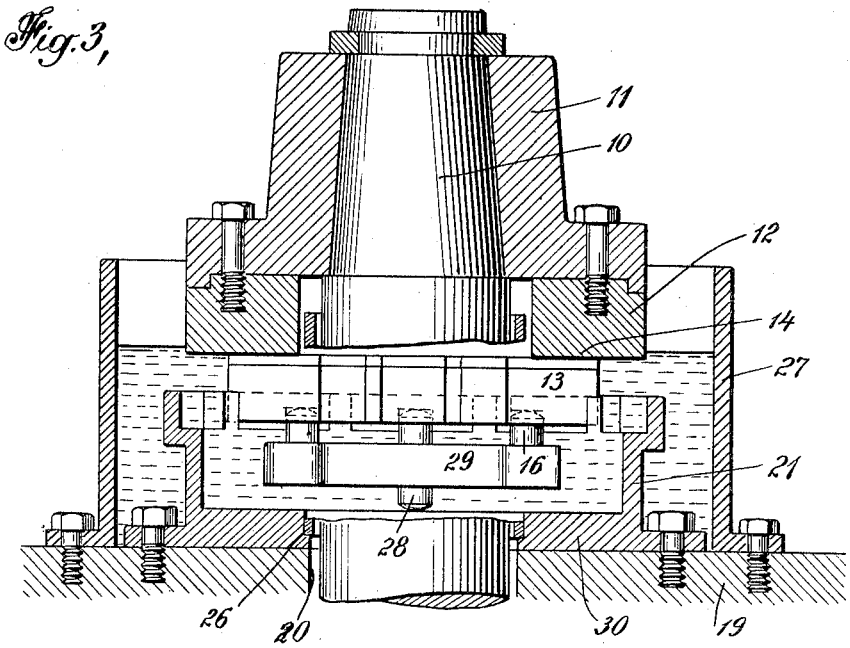
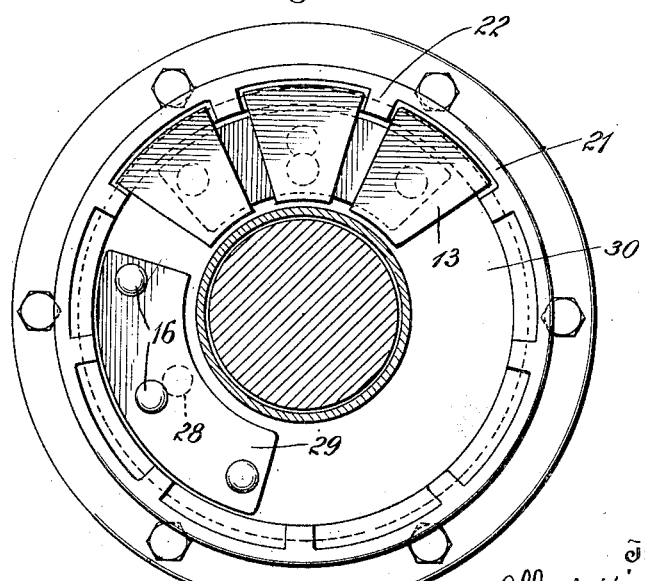

UNITED STATES PATENT OFFICE.

ALBERT KINGSBURY, OF PITTSBURGH, PENNSYLVANIA.

BEARING.

1,378,546. Specification of Letters Patent. Patented May 17, 1921.

Original application filed March 25, 1916, Serial No. 86,535. Divided and this application filed August 29, 1917, Serial No. 188,727. Renewed September 21, 1920. Serial No. 411,810.

*To all whom it may concern:*

Be it known that I, ALBERT KINGSBURY, a citizen of the United States of America, and a resident of Pittsburgh, Allegheny County, and State of Pennsylvania, have invented certain new and useful Improvements in Bearings, of which the following is a specification, reference being had to the accompanying drawings, forming a part thereof.

My invention relates to bearings and particularly to bearings, such as thrust bearings, which comprise bearing portions, segments or shoes mounted to respond to the wedging action of the lubricating fluid and provided with means for distributing the pressure thereon.

This application is a division of my copending application Serial No. 86,535, filed March 25, 1916.

The object of my invention, generally stated, is to provide a structure of this class which can be very easily and inexpensively built, and which will effectively distribute or equalize the load over all parts of the bearing surface even though the bearing members are carelessly machined and the shoe segments therefore vary greatly in relative thickness—either because of inaccuracies in the original fitting, or because of unequal wear in use, or because of temperature changes during running, or on account of any other cause.

Another object of my invention is to provide a bearing comprising a circumferential series of bearing portions or segments arranged in groups of three or more, with a plurality of separately-acting pressure-distributing members, one for each of said groups, adapted to predeterminately distribute the bearing pressure thereon.

Another object of my invention is to provide a bearing comprising a plurality of bearing segments arranged in groups of three or more, with all of the segments of each group interbalanced by a single pressure-distributing or equalizing member which is supported on a point or line that intersects the resultant of the forces acting on the segments of said group.

Another object of my invention is to provide a bearing, comprising a plurality of bearing segments, with means for predeterminately distributing the pressure among said segments in groups of more than two segments, and means for predeterminately distributing the bearing pressure among the segments of each group.

Another object of my invention is to provide a bearing comprising a plurality of bearing segments arranged in concentric series with means for equitably distributing the bearing pressure among the segments of said series.

Another object of my invention is to provide a structure of the aforesaid character that shall embody pressure-distributing or equalizing means for tiltably supporting more than two segments or shoes in a group.

Another object is to provide a triangular pressure-distributer adapted to support a tiltable bearing segment near each corner of the triangle.

Still another object is to provide a pressure-distributer that may be used to carry a plurality of bearing segments of two concentric groups, two of the outer group, and one of the inner group, for example.

In order that my invention may be thoroughly understood I will now proceed to describe the same in the following specification, and then point out the novel features thereof in appended claims.

The invention is capable of receiving a variety of mechanical expressions, two of which are shown on the accompanying drawings, but it is to be expressly understood that the drawings are for purposes of illustration only and are not to be construed as a definition of the limits of the invention, reference being had to the appended claims for that purpose.

Referring to the drawings:

Figure 1 is a sectional elevation, taken on the line 1—1 of Fig. 2, of a bearing which constitutes an embodiment of my invention.

Fig. 2 is a sectional plan view, on the line 2—2 of Fig. 1, with certain of the parts removed to show the structure in detail.

Figs. 3 and 4 are views corresponding respectively to Figs. 1 and 2, of another embodiment of my invention.

In the form shown in Figs. 1 and 2, the structure comprises a rotatable member including a shaft 10 to which a thrust block 11 and a thrust collar 12 are attached; and a relatively stationary member including a plurality of tiltable bearing segments or shoes 13 which are arranged in two concentric series, coöperate with the bearing surface 14 of the thrust collar and are mounted on pressure-distributing blocks 15.

The blocks 15 in this embodiment are triangular in shape and have upwardly extending projections 16 with rounded tops which constitute pivots for the bearing segments or shoes and extend into apertured lugs 17 thereon. Each block or member 15 supports two bearing segments of the outer series and one of the inner series, and said segments may tilt both radially and tangentially on the spherical surfaces of the projections 16.

The stationary member of the bearing also comprises an annular base 18 which is attached to a frame or foundation 19 and has a central opening 20 through which the shaft 10 extends. Projecting upwardly from the base is a flange 21 having lugs 22 which extend between the shoes 13 of the outer group and webs 23 from which lugs 24 extend between the shoes of the inner group. By this means the shoes are held against improper turning and against displacement.

The pressure-distributing blocks 15 may be mounted on any suitable pivotal supports such as the screws or bolts 25 shown in Fig. 1 which have rounded heads and constitute adjustable pivots for the blocks.

A sleeve 26 loosely surrounds the shaft and is attached to the base 18, and coöperates with an outer wall or flange 27 in providing an oil well or housing for the bearing.

The bearing segments or shoes are free to tilt in response to the wedging action of the oil when the bearing is in service and each of the blocks 15 equally or otherwise suitably distributes the thrust pressure on the bearing segments or shoes which it supports. The flexibility of each block may further contribute to the equitable distribution of pressure upon the shoes which it carries, and this flexibility is particularly effective in securing the desired pressure-distribution if more than three shoes are mounted on a single block. The pressure on the several groups of bearing segments may be equalized in any suitable way. In the form shown the screws 25 constitute manually-adjustable means for effecting the desired distribution of pressure between the several groups of bearing segments. Each group of bearing segments or shoes is supported in the line of the resultant of the desired pressures on the three bearing shoes constituting each group. These pressures are concentrated and transmitted to the members 15 at the points 16 of pivotal connection with the shoes. If the shoes are of equal area and it is desired to maintain an equal bearing pressure per unit area on all portions of the surface, the pivotal point of support for the member 15 should be located at one-third of the radial distance from the inner shoe pivot to the line joining the outer shoe pivots. If the triangle formed by the three shoe pivots is an equilateral one, this point of support will be at the center of the said triangle. If the areas of the three shoes of each group are different, or if they are unsymmetrically disposed with reference to each other it is still possible to establish and maintain uniform pressure engagement per unit of area on all bearing surfaces of the group members by locating the pivot in the line of the resultant of the proper pressures—which in this case will be the product of the uniform pressure per unit area times the area—on the three shoe pivots. The shape of the pressure-distributing or equalizing member 15 itself is of course immaterial but the location of the pivot projections will depend on the desired distribution of the bearing pressure and the arrangement of the shoes in the group.

Therefore, each group of bearing segments or shoes 13 and the pressure-distributing or equalizing member 15 on which they are mounted constitute what may be termed an individual balanced unit or system, in which the load or bearing pressure on each segment is entirely supported on the single pivot connection 16 between the segment and said member, and the resultant of the pressures on the several segments of the unit is carried on the single pivot connection 25. Under the conditions of equilibrium which are automatically established in the system, the resultant of the pressures (which are concentrated on the pivot supports 16) will pass through the point or line of support of the unit or system as a whole; i. e. through the screw 25. In this way the pressures on the several bearing portions or segments comprised in each system may be distributed as desired, since, while the moments of the pressures on the respective bearing portions about the fulcrum of each system must be balanced, said pressures will be distributed in accordance with the lengths of the lever arms from said fulcrum to the points 16 at which the pressures on the bearing portions act on each member 15. By suitably selecting the distances between the respective projections 16 and the point of engagement of the projection 25 with each block or member 15, the pressures on the several segments of each group may be equalized or suitably distributed, either radially or circumferentially, or both, to secure differential sustaining pressures.

In Figs. 3 and 4 I have shown a bearing comprising only a single annular series of bearing segments or shoes and the three point or triangular pressure-distributing or equalization system is there employed for supporting three successive shoes 13.

In this arrangement (see Figs. 3 and 4) the pressure-distributing or equalizing members are designated 29 and are mounted upon downwardly extending projections 28 which pivot on the base 30 which corresponds to the base 18.

The shoes are held in proper relative position, with respect to the part 30, by the upper bell-shaped portion of the flange 21 and the inwardly extending lugs 22 thereon; and the members 29 are maintained in proper relationship to the shoes which they support by the engagement of the pivot projections 16 with the coöperating recesses in the lower faces of the shoes. In these last respects the arrangement and the functional action of the parts shown in Figs. 3 and 4 corresponds substantially with that of the corresponding parts illustrated in Figs. 1 and 2. Other analogies and similarities between the two illustrative embodiments of my invention will be apparent, like parts being designated by the same reference characters in all the figures.

My improved construction is particularly desirable and advantageous when the bearing is called upon to sustain a very heavy thrust pressure, and therefore has a thrust collar which is relatively wide, because when a collar or disk such as the collar 12 in Figs. 1 and 2 is in operation, it has a tendency to heat and to assume a frusto-conical shape having a low altitude, instead of maintaining its original shape in which the bearing surfaces are in a single plane.

As has already been pointed out, and as will now be clearly apparent, the triangular equalizers used to pivotally support each group of three shoes are particularly designed and adapted not only to initially establish substantial uniformity of bearing pressure on all parts of the thrust engaging surfaces but also to automatically maintain that uniformity of pressure under any conditions of distortion or displacement that may arise in operation; and thus avoid undesirable tendencies to unequal wear and variable heating of the bearing parts.

It will therefore be noted that in both of the illustrative embodiments of my invention hereinbefore described, one of the relatively rotatable bearing members comprises a circumferential series of bearing portions or segments, which are assembled in groups, or units, each of which consists of three or more adjacent segments tiltably mounted at the vertices of separately-acting pressure-distributing or equalizing blocks that are themselves tiltably supported at what may be termed the centers of pressure of the groups of segments. This arrangement secures an automatic equalization or predetermined distribution of the bearing pressure on all of the segments of one group even when the said segments may vary considerably in thickness—either because of variations in machining or because of inequalities in subsequent wear or from unequal heating during running, etc.,—or in surface form or area. This is a very great advantage, particularly in the case of very large bearings, not only because it reduces the cost of construction and largely eliminates the care ordinarily required in assembling and adjusting the bearing parts, but also because it facilitates the use of a larger number of smaller bearing segments or shoes—as the individual interbalanced elements of a unitary group—and thus improves the action of the bearing both in maintaining the desired oil films between the bearing surfaces and in avoiding the detrimental effects due to the "crowning" of those surfaces under unequal heating. The pressure on the several segments or shoes of any one group having thus been automatically distributed in accordance with the desired reactive or sustaining pressures which it is desired to maintain on each segment or shoe—as just explained—the distribution of the load on the different groups or units may, in turn, be effected in any suitable way as by making the pivotal supports manually adjustable in the manner illustrated in Fig. 1. And here again the advantage of assembling the bearing segments or shoes in separate groups or units is rendered apparent by the immediate reduction in the number of the adjustable points of support on the base ring and the consequent wider separation of those points on the said ring—which permits of a quicker and more perfect equalization or subdivision of the bearing load over the different groups of segments or shoes considered as separate units.

It will therefore be perceived that I have invented a simple and effective system of pressure-distributing members whereby the pressure on the several bearing portions or segments may be equalized or otherwise distributed in accordance with the character of the oil films which it is desired to maintain. The term "equalizing member," or similar expressions, as herein used, is therefore sufficiently broad to embrace means for effecting pressure distribution through equalization of moments of reactive or sustaining pressures of different specific magnitude.

While the embodiments of the invention illustrated on the drawings have been described with considerable particularity, it is to be expressly understood that the invention is not to be limited thereto, as the same is capable of receiving a variety of mechanical expressions, some of which will readily suggest themselves to those skilled in the art, while certain features thereof are capable of use without other features thereof. While the pivotal supports of the bearing segments have been shown as mounted on the pressure-distributing members, it is apparent that they could be positioned on the segments without departing from the spirit of this invention. Also the pivotal supports for the pressure-distributing members may be mounted on either said members or the base, as shown. Furthermore, while the pressure-distributing members have been shown as employed in supporting the bearing portions or segments on the relatively stationary bearing member, it will be apparent that said members could also be employed in mounting bearing segments or portions comprised in the structure of the relatively rotatable bearing member. It will also be apparent that the pressure-distributing or equalizing system herein disclosed is applicable to the equitable distribution of pressure on more than three bearing segments or shoes arranged in one or a plurality of concentric series. Reference is therefore to be had to the appended claims for a definition of the limits of the invention.

What I claim is:

1. A thrust bearing comprising a plurality of tiltable bearing shoes arranged in two concentric annular series, and tiltable equalizing blocks each supporting two shoes of one series and one of the other.

2. A thrust bearing comprising a plurality of tiltable bearing shoes arranged in two concentric annular series, adjustable pivots and interposed equalizing blocks of triangular shape having upwardly extending pivot projections near their corners, upon which the shoes are mounted.

3. A thrust bearing comprising a base, an equalizer pivotally mounted thereon and having three upwardly extending projections, and three bearing shoes tiltably mounted on the respective projections, the pivot of the equalizer being substantially at the center of the triangle defined by the pivots of the shoes.

4. A thrust bearing comprising a pressure distributing member having a pivotal support and more than two bearing shoes mounted on said member and so arranged relative to each other and relative to the pivotal support of said member that said pivotal support is substantially in the line of the resultant of the desired pressures on the bearing shoes.

5. A thrust bearing comprising three bearing shoes, a pressure-distributing member adapted to support the shoes in a triangular relation, and means for tiltably supporting said member substantially in a line with the resultant of the desired pressures on the bearing shoes.

6. A thrust bearing comprising a group of three bearing shoes arranged in a triangular relation, a pressure distributing member on which the shoes are pivotally supported, and means for tiltably supporting said member at a point within the triangle defined by the shoe pivots.

7. A thrust bearing comprising a group of three shoes arranged in triangular relation, a triangular pressure distributing member upon which the shoes are pivoted to tilt both radially and tangentially, and means for supporting said member to equitably distribute the pressure on the shoes.

8. A thrust bearing comprising a plurality of tiltable bearing shoes arranged in concentric rings, blocks each adapted to support two shoes of one ring and one shoe of the other ring, and a pivotal support for each block whereby the same is adapted to equitably distribute the pressure on the shoes which it supports.

9. A thrust bearing comprising the combination of a base having an annular flange, a plurality of bearing shoes arranged in concentric rings within the flange, and equalizing blocks pivotally mounted on the base and so arranged that each of said blocks supports two shoes of one ring and one shoe of the other ring, with webs extending inwardly from the base flange between the blocks and having lugs extending upwardly between the shoes of the inner group, and other lugs extending inwardly from the said flange between the shoes of the outer group.

10. A bearing comprising a plurality of bearing segments arranged in a plurality of concentric series, and means for equitably distributing the bearing pressure between the segments of the different series.

11. A bearing comprising a plurality of bearing segments arranged in a plurality of concentric series, and means for equitably distributing the bearing pressure between the segments of the different series and among the segments of the respective series.

12. A bearing comprising a plurality of bearing segments arranged in two concentric series and means for equitably distributing the pressure among the segments of both series.

13. A bearing comprising a plurality of bearing segments arranged in concentric series, and pressure-distributing members for supporting segments in a plurality of said series.

14. A bearing comprising a plurality of bearing segments arranged in concentric series, and pressure-distributing members on each of which segments of a plurality of said series are tiltably mounted.

15. A bearing comprising a plurality of bearing segments arranged in concentric series, and pressure-distributing members on each of which are mounted two segments of one series and one segment of another series.

16. A bearing comprising a plurality of bearing segments arranged both in groups and in concentric series, means for equitably distributing the bearing pressure on the segments of each group, and means for equitably distributing the bearing pressure between the respective groups.

17. A bearing comprising a plurality of bearing segments arranged in concentric series, means for predeterminately distributing the bearing pressure among groups of said segments, and means for predeterminately distributing the bearing pressure between the segments of each group.

18. A bearing comprising a plurality of bearing segments arranged in concentric series and in groups embracing segments of both series, means for predeterminately distributing the bearing pressure among the segments of each group, and means for predeterminately distributing the bearing pressure among the several groups of bearing segments.

19. A bearing comprising a plurality of bearing segments, and triangular equalizing members adjacent the corners of which said segments are tiltably mounted.

20. A bearing comprising a plurality of bearing segments, triangular equalizing members adjacent the corners of which said segments are tiltably mounted, and means for equitably distributing the bearing pressure between said members.

21. A bearing comprising a plurality of bearing segments arranged in concentric series, triangular equalizing members adjacent the corners of which said segments are tiltably mounted, and means for adjusting the pressure on said members.

22. A bearing comprising a plurality of bearing segments arranged in concentric series, triangular equalizing members adjacent the corners of which said segments are tiltably mounted, and means for tiltably mounting each of said members at a point within the triangle determined by the points of support of said segments.

23. A bearing comprising a plurality of bearing segments arranged in groups of at least three segments, and means for predeterminately distributing the bearing pressure among the segments of each group.

24. A bearing comprising relatively rotatable bearing members one of which includes a plurality of bearing portions arranged in groups, each of which includes at least three of said portions, and a plurality of separately-acting pressure-distributing members mounting said bearing portions to respond to the wedging action of the lubricating fluid and predeterminately distributing the bearing pressure on said bearing portions.

25. A bearing comprising relatively rotatable bearing members one of which includes a plurality of bearing portions arranged in groups, each of which includes at least three of said portions, and a plurality of separately-acting pressure-distributing members coacting with said bearing portions to predeterminately distribute the bearing pressure thereon.

26. A bearing comprising a plurality of bearing segments arranged in groups of at least three segments, a pressure-distributing member on which each group of segments is mounted, and means for pivotally mounting each of said members in the line of the resultant of the desired pressures on said segments.

27. A bearing comprising a plurality of bearing segments arranged in groups of at least three segments, pressure-distributing members on which the segments of each group are mounted to tilt both radially and tangentially, and means to tiltably support each of said members in the line of the resultant of the pressures acting on the segments of the corresponding group.

28. A bearing comprising a plurality of bearing segments arranged in groups each of which includes at least three segments, a pressure-distributing member on which the segments of each group are tiltably mounted, and means for pivotally mounting each of said pressure-distributing members.

29. A bearing comprising a plurality of bearing segments arranged in concentric series, and a plurality of tiltably mounted members on each of which are mounted segments of a plurality of series.

30. A bearing comprising a plurality of bearing segments arranged in groups of at least three segments, means for predeterminately distributing the bearing pressure among the segments of each group, and means for predeterminately distributing the bearing pressure among the respective groups.

31. A bearing comprising a plurality of bearing segments, and a plurality of pressure-distributing members on each of which three of said segments are so mounted as to concentrate the pressures on the respective segments at three points on said member, and means mounting each of said members in the line of the resultant of said pressures.

32. A bearing comprising a pressure-distributing member on which a plurality of bearing segments are so mounted as to transmit the resultants of their respective pressures to said member at a plurality of points bearing an angular relation to each other, and means mounting said member within the area defined by said points so as to effect a predetermined distribution of said pressure.

33. A bearing comprising a plurality of bearing segments arranged in groups of three segments, a pressure-distributing member for each group on which the segments are tiltably mounted in triangular relationship, and means for tiltably mounting each of said members in the line of the resultant of the desired pressures on the respective segments.

34. A bearing comprising a circumferential series of bearing segments, and a plurality of tiltably-mounted members on each of which three or more segments are mounted.

35. A bearing comprising a circumferential series of bearing segments, a plurality of members on each of which three or more segments are tiltably mounted, and means tiltably mounting each of said members.

In witness whereof, I have hereunto set my hand this 27 day of August, 1917.

ALBERT KINGSBURY.